(No Model.) 2 Sheets—Sheet 1.
F. E. HERDMAN.
ELECTRIC MOTOR.
No. 530,773. Patented Dec. 11, 1894.
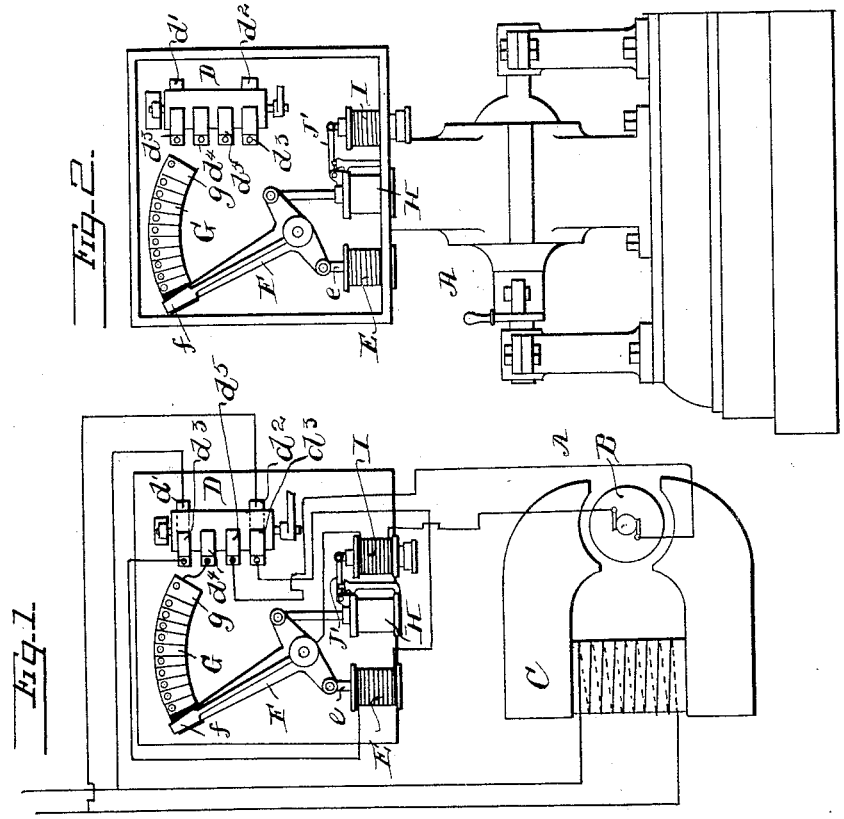
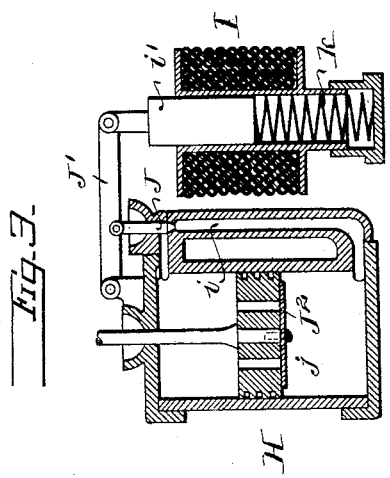
Witnesses:
Jesse B. Heller
Frank S. Busser
Inventor.
Frank E. Herdman
by G. F. Harding
Attorney.

(No Model.) 2 Sheets—Sheet 2.

F. E. HERDMAN.
ELECTRIC MOTOR.

No. 530,773. Patented Dec. 11, 1894.

Witnesses.
Jesse B. Heller
Frank S. Busser

Inventor.
Frank E. Herdman
by J. D. Harding
his Attorney.

UNITED STATES PATENT OFFICE.

FRANK E. HERDMAN, OF WINNETKA, ILLINOIS.

ELECTRIC MOTOR.

SPECIFICATION forming part of Letters Patent No. 530,773, dated December 11, 1894.

Application filed July 25, 1894. Serial No. 518,510. (No model.)

*To all whom it may concern:*

Be it known that I, FRANK E. HERDMAN, a citizen of the United States, residing at Winnetka, county of Cook, and State of Illinois, have invented a new and useful Improvement in Electric Motors, of which the following is a full, clear, and exact description, reference being had to the accompanying drawings, which form a part of this specification.

My invention is particularly adapted for use with a switch arm adapted to pass over resistances and to control the admission of current to the armature of the motor, and where the switch arm is automatically operated, and its passage over the resistances is resisted by a resistance device, such, for instance, as a dash pot. I will, therefore, describe my improvement as in use with an electric motor, and point out its advantages with such application; but, in so doing, I desire to be distinctly understood as not limiting my invention to such application, or to any particular application.

Figure 4:
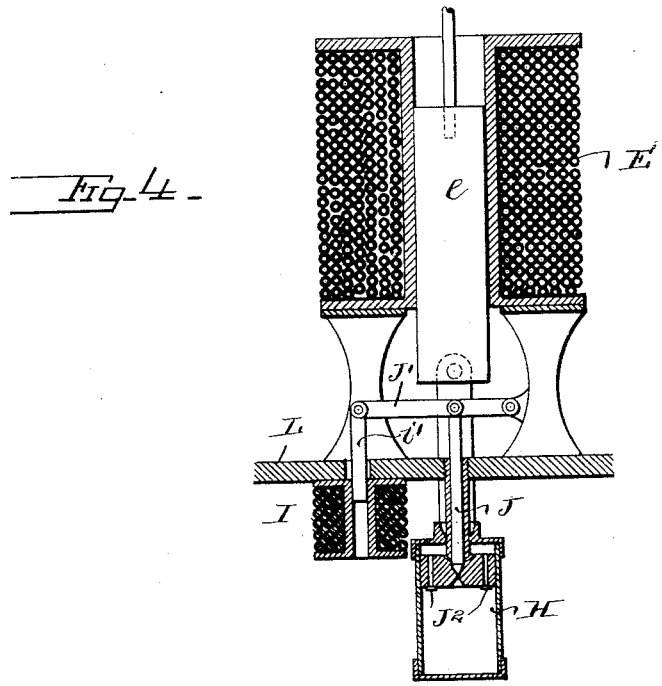
Figure 5:
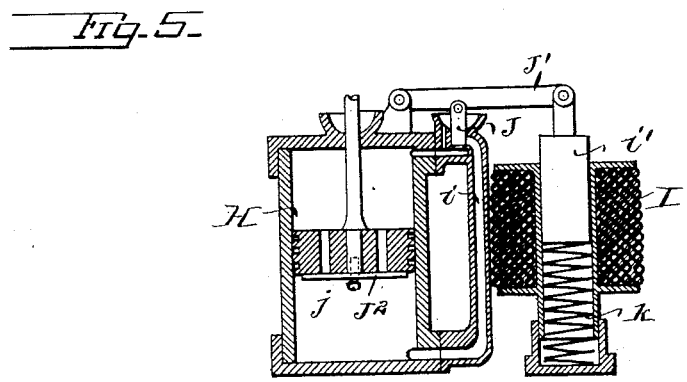

In the drawings:—Figure 1 is a diagrammatic view showing various parts with wiring. Fig. 2 is a view showing an electric motor, switch and its appurtenances, and their relation to each other. Fig. 3 is a sectional view of dash pot and its controlling solenoid, and their connection. Fig. 4 shows in section a modified form of valve for dash pot. Fig. 5 is a modified form of arrangement for dash pot and controlling solenoid.

My invention relates to improvements in an electrical device in which the translating device and the current devices are connected in the following manner: A switch, electric connection from said switch to the translating device, a second switch in said circuit, resistances in said circuit, and an arm adapted to travel over said resistances, and when the switch is operated, to admit current through the resistances, to the translating device, and to travel over said resistances gradually increasing the amount or strength of the current to the translating circuit, such, for instance, as is shown in Reissue No. 11,408, granted March 27, 1894, issued to this applicant. In this device, the speed of movement of the arm over the resistances, is regulated by a dash pot, and the translating device is the armature of the electric motor.

The object of the invention as applied to an electric motor and a resistance arm regulated by a dash pot, is to control the operation of the dash pot in proportion to the amount of current passing to the armature, and thereby regulating the speed at which the switch arm cuts the resistance out of circuit in proportion to the work required of the motor. If there is a light load on the motor it will readily attain its speed, and the counter electro motive force developed gradually, and in consequence the resistance can be cut out rapidly without detriment, thus allowing the motor to gain its speed quickly without using excessive current to start it. If, however, there is a heavy load on the motor, it gains its speed much more slowly, and the counter electro motive force develops slowly, and the resistances should be cut out of circuit much more slowly than in the former case, to prevent excessive current passing to the motor.

Speaking first of the construction as shown in Figs. 1, 2 and 3, in which A is an electric motor, B its armature, and C the field magnet, the wires from the source of current supply pass directly to the fields.

D is the armature controlling switch, and is of the type described in Letters Patent No. 519,120, and $d$ is the lever for operating said switch.

$d'$ $d^2$ are the brushes by which the current from the two poles of current supply passes to the switch, D, and from brushes $d^3$ $d^3$ the current from the switch is led to the solenoid, E, the core $e$, of which is connected to resistance arm, F, having the brush $f$, adapted to travel over the resistance, G.

$g$ is a plate in electrical connection with the resistances and with brush, $d^4$.

The arm F is in electrical connection with the armature through the solenoid I, and the armature is in electrical connection with the other pole of current supply by wire connecting with brush $d^5$ of switch D. When the switch is operated, the current is admitted to solenoid, E, energizing it and causing the arm to travel over resistance, admitting current to armature through resistances, which are gradually cut out until the arm or brush, $f$, reaches the plate, $g$, when the full force of the current passes to the armature.

H is a dash pot which is connected to the arm F, on the side opposite to the solenoid, E, and retards the movement of the arm over the resistances.

I is a second solenoid in the circuit to the armature. The construction of the solenoid I, the dash pot H, and their connection with each other are more fully shown in Fig. 3.

The dash pot at one side of the plunger is connected with the other side of said plunger by a tube or pipe $i$. In this tube or pipe is placed the valve J, which is held to its seat by a lever J', which is connected at its end with the core $i'$ of solenoid I.

At the bottom of plunger J' is a disk valve J, which opens in the upward movement of the plunger allowing liquid to pass quickly from one side to the other; but in the downward movement of the plunger, in order to force the liquid to the upper portion of the dash pot, the valve has to be unseated. The solenoid I is in the circuit to the armature. The amount of current passing to the armature is dependent upon the development of the counter electro-motive force. If the work on the motor is heavy in starting, the motor will gain its speed slowly, and in consequence will be slow in developing its counter electro motive force. Hence, to prevent excessive current passing to the armature, the resistance must be cut out of circuit slowly. If there is but a light load on the motor when starting, it will gain its speed quickly, and, in consequence, will develop its counter electro motive force quickly, thus allowing the resistance to be cut out of circuit more rapidly. The solenoid I being in circuit with the armature its strength is directly proportionate to the armature current, and a proportionate resistance put upon the valve J, as the strength of the solenoid is increased or decreased.

The resistance arm and dash pot are arranged so that with the ordinary load the speed of passage of the arm is such that the amount of current admitted bears a relation to the counter electro motive force, but, if the motor be heavily loaded and takes its speed slowly, the switch arm in ordinary construction would have a tendency to pass over the resistance at such a speed as to admit the current too rapidly to the motor, and not proportionate to the development of the counter electric motive force, but with the construction of this application, the solenoid I, under such circumstances, would be energized, and, as the current increased, the core would hold the valve J tighter upon its seat, creating a greater resistance to the passage of the piston in the dash pot, checking the motion of the switch arm, and making its movement more gradual. If the motor gains its speed rapidly, less current passes to solenoid I, and there is less tension on valve J, and, in consequence, the piston of the dash pot can travel much more rapidly, thus allowing the resistances to be cut out more rapidly and allowing the maximum efficiency to be reached more readily.

To the under side of the core of the solenoid is attached a coil spring $k$ whereby the tension can be adjusted in accordance with the amount of current at which it is desired the core shall overcome the spring and act upon the valve J.

In Fig. 5 is shown a modified form of valve J, in which the pressure comes against the side of the valve, and in this arrangement, the spring $k$ must be of such strength that when no current is passing through the solenoid I the valve J will be held free and allow the quick passage of the plunger in the dash pot, and as the current enters the solenoid I, it lifts the core in proportion to the amount of current in opposition to the spring, and thereby closes the valve in proportion, checking the movement of the piston of the dash pot in accordance.

In Fig. 4 I have shown a somewhat different arrangement. The dash pot, instead of being attached to the switch arm is attached to the core of the solenoid, the dash pot itself moving and the piston remaining stationary. L is a bracket upon which the solenoid I stands. H is the dash pot attached to the core $e$ of the solenoid E. The piston rod of the dash pot is fastened to the bracket L. This piston rod is made hollow, and has the valve rod extending through it, to which is connected the valve J. The other end of this rod is connected to the core of solenoid I. At the bottom of the piston is a valve chamber, connecting the lower side of the piston with the upper side, and the speed at which this dash pot is drawn up by the core is governed by the pressure with which the valve is held to its seat by the core of solenoid I.

Having now fully described my invention, what I claim, and desire to protect by Letters Patent, is—

1. The combination with a translating device, a switch, electric connection from said switch to the translating device, resistances in said circuit, a second switch in said circuit, an arm adapted to travel over said resistances and increase the amount or strength of current in the circuit to the translating device, of a device adapted to retard the movement of said arm over said resistances, mechanism for varying the retarding strength of said device, a solenoid in the circuit with the translating device, and connection between the solenoid and regulating mechanism of retarding device, the connection being such that when said solenoid is excited, the mechanism is thrown into action to increase the retarding strength of said device.

2. The combination with an electric motor, a switch, electric connection from said switch to the armature of said motor, resistances in said circuit, an arm adapted to travel over said resistances and increase the amount or strength of current in the circuit to the armature of said motor, actuating mechanism for operating said arm, of a device adapted to retard the movement of said arm over said resistances, mechanism for varying the retarding strength of said device, a solenoid in circuit with the circuit to the armature of said motor, and connection between the solenoid and regulating mechanism of retarding device, the connection being such that when said solenoid is excited the mechanism is thrown into action to increase the retarding strength of said device.

3. The combination with a translating device, electric connection from a source of current supply to said translating device, resistances in said circuit, an arm adapted to pass over said resistances and increase the strength of current in the circuit to the translating device, of a device adapted to retard the travel of said arm over said resistances, mechanism for varying the retarding strength of said device, a solenoid in the circuit to the translating device, and connection between the solenoid and regulating mechanism of retarding device, the connection being such that when said solenoid is excited, the mechanism is thrown into action to increase the retarding strength of said device.

4. The combination with an electric motor, electric connection from a source of current supply to the armature of said motor, resistances in said circuit, an arm adapted to pass over said resistances and increase the strength of current in the circuit to the armature of said motor, actuating mechanism for operating said arm, of a device adapted to retard the travel of said arm over said resistance, mechanism for varying the retarding strength of said device, a solenoid in the circuit to the armature of said motor, and connection between the solenoid and regulating mechanism of retarding device, the connection being such that when said solenoid is excited the mechanism is thrown into action to increase the retarding strength of said device.

5. In combination with a translating device, a switch, electric connection from said switch to the translating device, resistances in said circuit, a second switch in said circuit, an arm for closing and opening said second switch, said arm being adapted to travel over said resistances and increase the amount or strength of current in the circuit to the translating device, actuating mechanism for operating said arm, a dash pot for controlling the speed of movement of said arm over said resistances, a valve to control the passage of liquid in the dash pot, a solenoid in the circuit to the translating device, and connection between the core of the solenoid and the stem of said valve, the connection being such that when said solenoid is excited the valve is acted upon in the direction to close it.

6. In combination with an electric motor, a switch, electric connection from said switch to the armature of said motor, resistances in said circuit, a second switch in said circuit, an arm for closing and opening said second switch, said arm being adapted to travel over said resistances and increase the amount or strength of current in the circuit to the armature of said motor, actuating mechanism for operating said arm, a dash pot for controlling the speed of movement of said arm over said resistances, a valve to control the passage of liquid in the dash pot, a solenoid in the circuit to the armature of said motor, and connection between the core of the solenoid and the stem of said valve, the connection being such that when said solenoid is excited the valve is acted upon in the direction to close it.

7. The combination with a translating device, electric connection from a source of current supply to said translating device, resistances in said circuit, an arm adapted to pass over said resistances and increase the strength of current in the circuit to the translating device, actuating mechanism for operating said arm, of a dash pot for controlling the speed of movement of said arm over said resistances, a valve to control the passage of liquid in the dash pot, a solenoid in the circuit to the translating device, and connection between the core of the solenoid and the stem of said valve, the connection being such that when said solenoid is excited the valve is acted upon in the direction to close it.

8. The combination with an electric motor, electric connection from a source of current supply to the armature of said motor, resistances in said circuit, an arm adapted to pass over said resistances and increase the strength of current in the circuit to the armature of said motor, actuating mechanism for operating said arm, of a dash pot for controlling the speed of movement of said arm over said resistances, a valve to control the passage of liquid in the dash pot, a solenoid in the circuit to the armature of said motor, and connection between the core of the solenoid and the stem of said valve, the connection being such that when said solenoid is excited the valve is acted upon in the direction to close it.

9. In combination with a translating device, a switch, electric connection from said switch to the translating device, resistances in said circuit, a second switch in said circuit, an arm for closing and opening said second switch, said arm being adapted to travel over said resistances and increase the amount or strength of current in the circuit to the translating device, of a device adapted to retard the travel of said arm over said resistances, mechanism for varying the retarding strength of said device, and means to operate said mechanism to increase its retarding strength dependent upon the amount or strength of the current passing to the translating device.

10. The combination with an electric motor, a switch, electric connection from said switch to the armature of said motor, resistances in said circuit, a second switch in said circuit, an arm for closing and opening said second switch, said arm being adapted to travel over said resistances and increase the amount of current in the circuit to the armature of said motor, actuating mechanism for operating said arm, of a device adapted to retard the travel of said arm over said resistances, mechanism for varying the retarding strength of said device, and means to operate said mechanism to increase its retarding strength dependent upon the amount or strength of the current passing through the armature.

11. The combination with the translating device, electric connection from a source of current supply to said translating device, resistances in said circuit, an arm adapted to pass over said resistances and increase the strength of current in the circuit to the translating device, of a device adapted to retard the travel of said arm over said resistances, mechanism for varying the retarding strength of said device, and means to operate said mechanism to increase its retarding strength dependent upon the amount or strength of current passing to the translating device.

12. The combination with an electric motor, electric connection from a source of current supply to the armature of said motor, resistances in said circuit, an arm adapted to pass over said resistances and increase the strength of current in the circuit to the armature of said motor, actuating mechanism for operating said arm, of a device adapted to retard the travel of said arm over said resistances, mechanism for varying the retarding strength of said device, and means to operate said mechanism to increase its retarding strength dependent upon the amount or strength of the current passing to the armature.

13. In combination with a translating device, a switch, electric connection from said switch to the translating device, resistances in said circuit, a second switch in said circuit and an arm for closing and opening said second switch, said arm being adapted to travel over said resistances and increase the amount or strength of current in the circuit to the translating device, actuating mechanism for operating said arm, of a dash pot for controlling the speed of movement of said arm over said resistances, a valve to control the passage of liquid in the dash pot, and means to act on said valve to close the same to an extent dependent upon the current passing to the armature.

14. An electric current transmitting or circuit-closing apparatus, comprising essentially a circuit closing device, a secondary contact lever, a solenoid for operating the secondary lever, a circuit connection whereby upon the closing of the circuit by the circuit closing device, the secondary lever is automatically set in motion to gradually increase the strength of current flowing through the circuit, a second solenoid in said circuit adjusted to the desired current, and means to regulate the speed of movement of said contact lever inversely to the extent said last mentioned solenoid is energized.

15. The combination with a translating device, electric connection from a source of current supply to said translating device, resistances in said circuit, an arm adapted to pass over said resistances and increase the strength of current in the circuit to the translating device, actuating mechanism for operating said arm, of a dash pot for controlling the speed of movement of said arm over said resistances, a valve to control the passage of liquid in the dash pot, a solenoid in the circuit to the translating device, and connection between the core of the solenoid and the stem of said valve, the connection being such that when said solenoid is excited, the valve is acted upon to close to an extent proportionate to the amount or strength of the current to the translating device.

16. In combination with the translating device, electric connection from a source of current supply to said translating device, resistances in said circuit, an arm adapted to pass over said resistances and increase the strength of current in the circuit to the translating device, of a device adapted to retard the travel of said arm over said resistances, mechanism controlled by the translating device current to increase the retarding strength of said device proportionate to the amount or strength of said current.

17. In combination with a translating device, a switch, electric connection from said switch to the translating device, resistances in said circuit, a second switch in said circuit and an arm for closing and opening said second switch, said arm being adapted to travel over said resistances and increase the amount or strength of current in the circuit to the translating device, actuating mechanism for operating said arm, of a dash pot for controlling the speed of movement of said arm over said resistances, a valve to control the passage of liquid in the dash pot, and a device controlled by the translating device current and connected with said valve to close it to an extent proportionate to the amount or strength of said current.

In testimony of which invention I have hereunto set my hand.

FRANK E. HERDMAN.

Witnesses:
  F. J. HOWELL,
  C. D. HOYT.